United States Patent

[11] 3,523,566

| [72] | Inventors | Theodore J. Reinhart, Jr.<br>345 Forrer Blvd., Dayton, Ohio 45419;<br>Weldon M. Scardino, 340 Edgebreak Drive,<br>Dayton, Ohio 45459 |
|---|---|---|
| [21] | Appl. No. | 748,446 |
| [22] | Filed | July 29, 1968 |
| [45] | Patented: | Aug. 11, 1970 |

[54] FILAMENT WOUND TOROIDAL TIRE
6 Claims, 9 Drawing Figs.
[52] U.S. Cl. .................................................. 152/355, 152/366
[51] Int. Cl. ...................................................... B60c 9/06, B60c 5/16
[50] Field of Search ........................................... 152/354, 355, 356, 352, 366, 387, 330, 349

[56] References Cited
UNITED STATES PATENTS
3,171,462  3/1965  Reinhart........................ 152/355
FOREIGN PATENTS
658,718  1/1965  Belgium.................... 152/330

*Primary Examiner* — Arthur L. La Point
*Assistant Examiner* — Charles B. Lyon
*Attorney* — Harry A. Herbert, Jr. and Charles H. Wagner ABSTRACT: An inflatable filament wound toroidal tire for drop center solid rims, in which the reinforcing filament strands are toroidally wound around the circular axis of the tire and inflation area and are imbedded in the carcass thereof between the inner and outer tire surfaces. The inner circumferential rim seating area of the tire is made of a relatively softer elastic rubber-like matrix, shaped to fit and seat in a conventional drop center solid rim with the toroidal reinforcing filament strands molded in the tire and extending transversely to the circular axis thereof. Annular resilient tensioning means extend around the inner annular portion of the tire and are imbedded in the softer circumferential rim fitting area between the toroidal strands and the interior inflatable tire area and radially and yieldably contact the rim fitting and seating area of the tire into intimate seating contact with the drop center tire receiving portion of the rim. It is contemplated that the drop center portion of the rim and the inner annular rim seating portion of the tire may be formed with annular or circumferentially spaced complementary interengaging lugs or shoulders to resist slippage between the tire and the rim and retained in interlocking engagement by the resilient tensioning means.

Patented Aug. 11, 1970 3,523,566
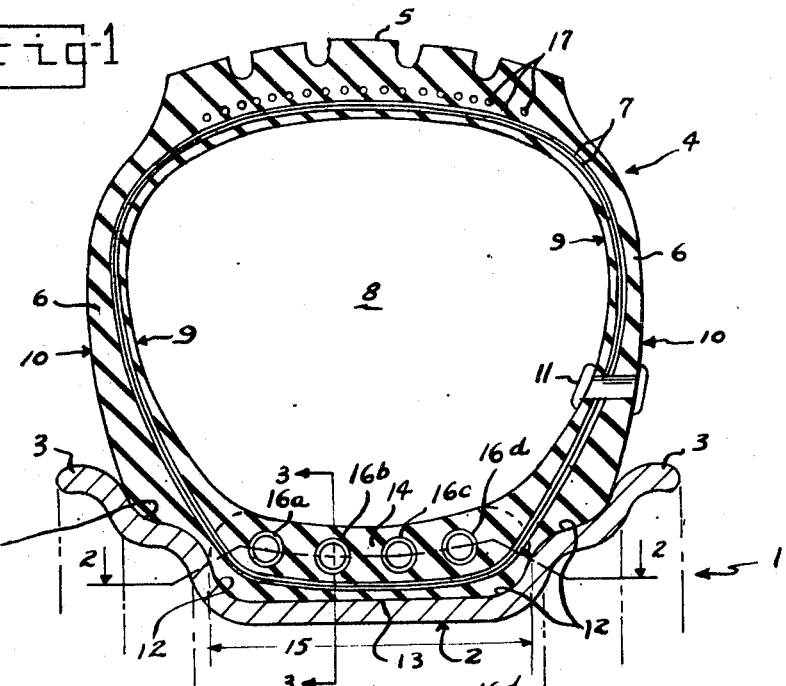
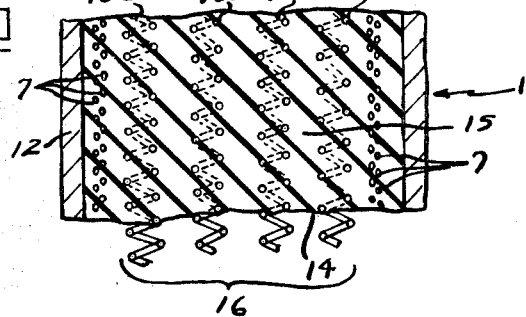
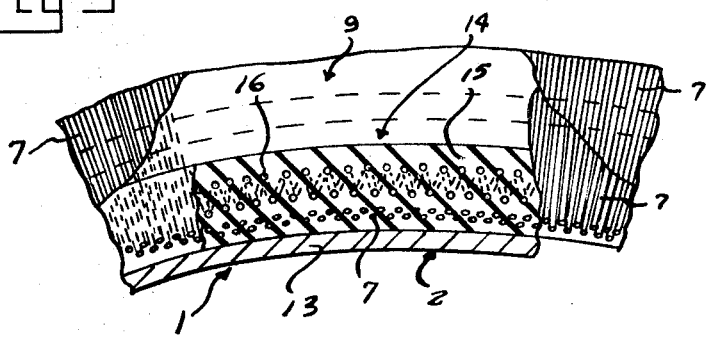
INVENTORS
THEODORE J. REINHART, JR.
WELDON M. SCARDINO
BY Harry A. Herbert Jr.
and
Charles K. Wagner
ATTORNEYS

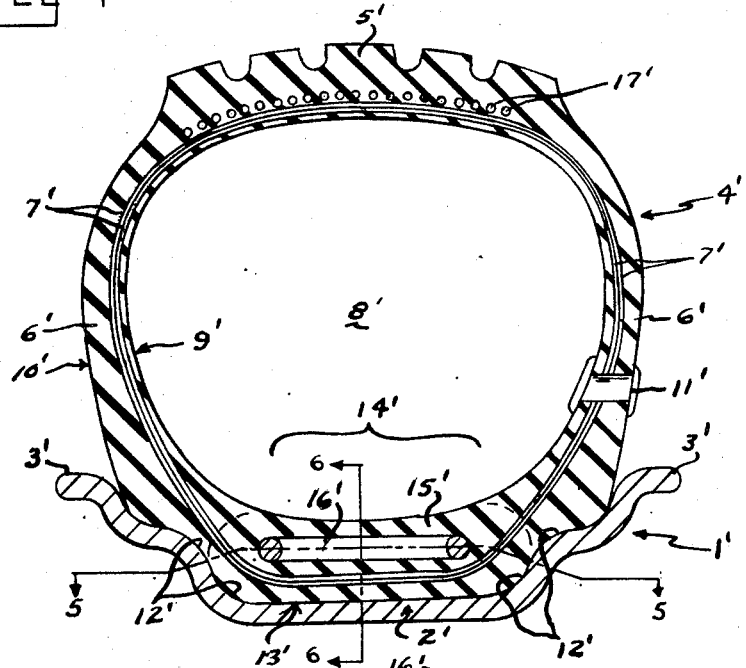
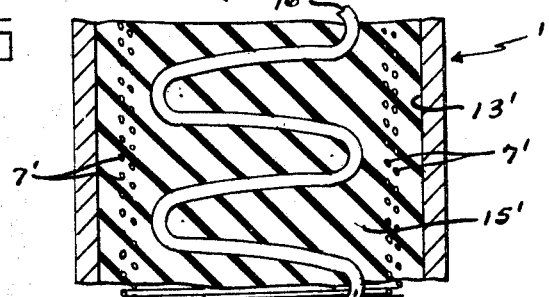
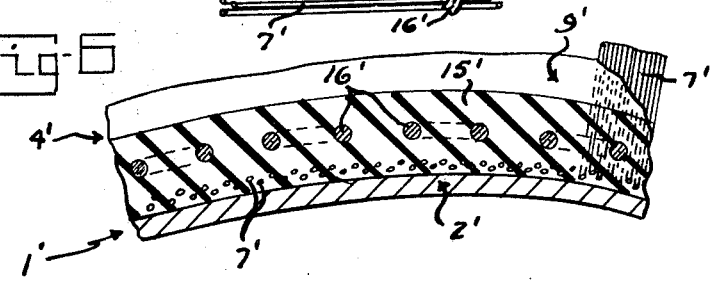

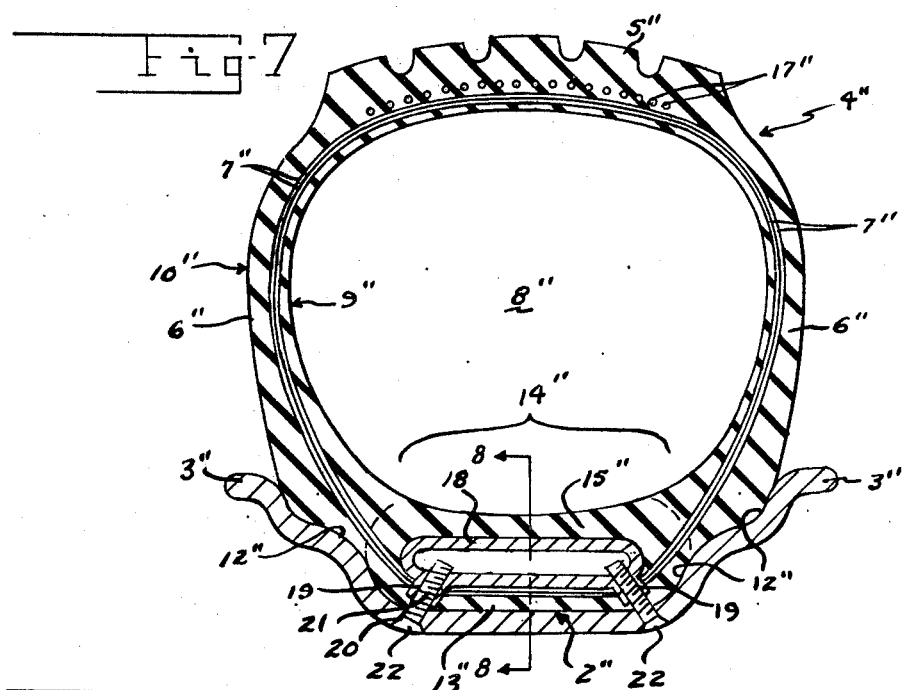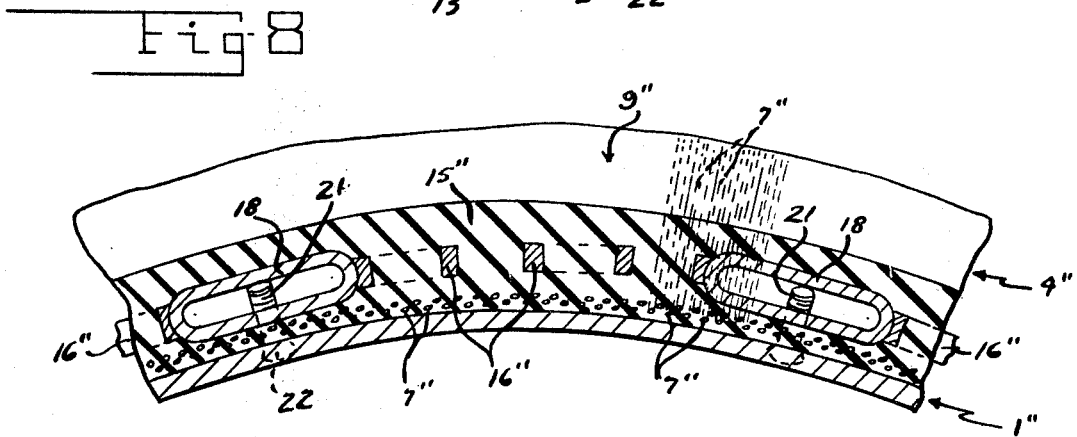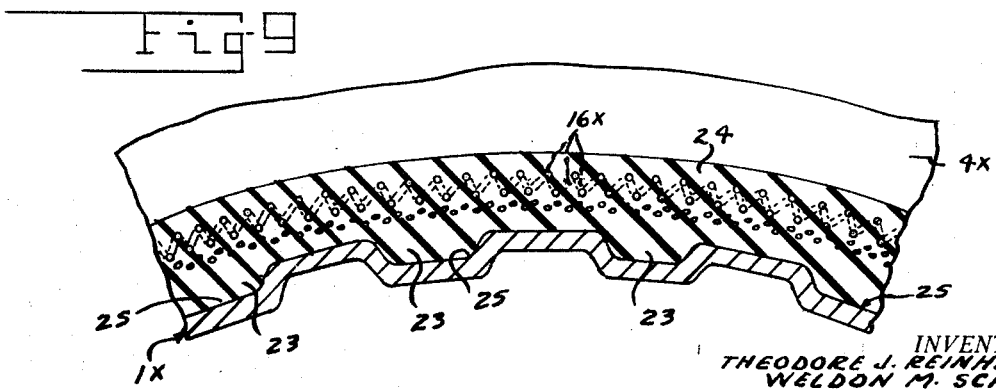

FILAMENT WOUND TOROIDAL TIRE

BACKGROUND OF THE INVENTION

Toroidal tires of the filament wound type usually incorporate a solid inflexible circumferential inner section which makes the tires incompatible to non-split or solid rim wheels and this inner annular portion is therefore non-stretchable and cannot be stretched over the beads of a conventional wheel rim. These tires, such as disclosed in U.S. Patent 3,171,462 when used with a split rim are quite satisfactory as aircraft tires. However, they are not satisfactory for use on bicycles, motorcycles, passenger cars, buses and trucks having non-split or solid rim wheels.

FIELD OF THE INVENTION

The invention involves the use of an inflatable toroidal wound filament tire for use on, or with, conventional non-split rims and makes the toroidal tire of the present invention available for use on the conventional wheels and rims of conventional bicycles, motorcycles, passenger cars, buses and trucks.

SUMMARY OF THE INVENTION

The invention involves the use of a circumferential inner rim engaging section, in a toroidal wound inflatable filament tire, that is very strong and elastic, thus enabling the tire to be stretched over a conventional wheel solid rim and then be inflated into place while still incorporating all of the desirable features of the toroidal filament wound aircraft tire.

The tire incorporates a very strong, highly elastic tire retaining assembly which locks or retains the tire securely seated in the annular tire receiving portion of a conventional non-split or "drop center" wheel rim. The inflation pressure, when the tire is inflated, assists in providing additional radial inward pressure for engagement of the inner periphery of the tire with the tire receiving and seating peripheral portion of the rim to prevent rotation of the tire on the rim at low pressures. The elastic tire contracting spring means in the tire will prevent loss of the tire from the rim, and enable the driver to maintain control upon a sudden loss of pressure. As an additional concept a positive mechanical interlock against relative slippage between the tire and the rim is provided by complemental interengaging lugs and recesses formed around the rim and the inner surface of the tire, or metal inserts are molded in the inner periphery of the tire, inside of the toroidal wound filaments or cords and suitable screw fasteners are provided in the rim to engage the inserts and provide a positive mechanical lock between the tire and the rim.

BRIEF DESCRIPTION OF THE DRAWING

Like reference characters refer to like parts in the several figures of the drawing in which:

FIGURE 1 is a transverse or radial section through one form of toroidal tire and non-split drop center rim, incorporating one form of the invention.

FIGURE 2 is a sectional view taken approximately on line 2-2 in FIGURE 1, looking in the direction of the arrows.

FIGURE 3 is a fragmentary sectional view taken about on line 3-3 in FIGURE 1, looking in the direction of the arrows, parts of the tire surface being broken away to show the toroidal wound filaments or cords.

FIGURE 4 is a radial or transverse sectional view, similar to FIGURE 1, but showing a slightly modified type of annular tensioning means in the rim seating inner peripheral portion of the tire.

FIGURES 5 and 6 are sectional views taken approximately on lines 5-5 and 6-6 of FIGURE 4, and looking in the direction of the arrows.

FIGURE 7 is a transverse sectional view, similar to FIGURE 1, but illustrating a further modification incorporating metallic inserts in the inner peripheral tensioning means and positive removable mechanical connecting means between the rim and the metallic inserts.

FIGURE 8 is a fragmentary sectional view, taken about on line 8-8 in FIGURE 7, looking in the direction of the arrows.

FIGURE 9 is a fragmentary sectional view of a further modification illustrating a form of interlock between the rim, and engaging inner annular portion of the tire.

DESCRIPTION OF THE PREFERRED EMBODIMENT

Referring to FIGURES 1 to 3, the reference numeral 1 denotes a conventional type solid or non-split rim, preferably of the "drop center" type, having an annular drop center portion 2 and the usual side beads 3.

The toroidal wound tire embodying the invention is indicated generally at 4 and comprises a carcass which is annular in cross section, having the tread portion 5 and side walls 6 with the filament strands 7 encircling the inflatable central area 8 and imbedded in the carcass between the outer and inner wall surfaces 9 and 10. The tire may be provided with any suitable or conventional tire inflation valve means such as indicated at 11 secured in, and passing through, the side wall 6.

The rim engaging and seating portion, indicated generally at 12, is of course molded or shaped to seat and fit in the drop center portion 13 of the rim 1 between the side walls of the beads 3, somewhat similar to the general shape of a conventional tire for drop center rims, except that carcass is annular in cross section and comprises tough flexible side walls and the portion between the beads, particularly the portion indicated at 14 which is received in the drop center channel of the rim 1, is made of a relatively softer elastic rubber like matrix 15. The inner annular elastic rim seating portion 14-15 is somewhat thicker, substantially as shown, to provide the annular inner inflatable area 8 with a contour that is substantially circular in cross section as shown. The resilient tensioning means 16 extends around the inner peripheral portion of the tire 1 and is imbedded in the matrix 15 between the inner inflatable area 8 and the toroidal filament strands 7, and is preferably under some tension so as to tension the rim engaging and seating portion 14 radially inward into firm seating engagement with the annular tire seating contour or drop center portion of the rim 1, between the side beads 3.

As shown in FIGURES 1 to 3, this tensioning means comprises a plurality of annular coil springs, indicated specifically at 16a, 16b, 16c and 16d in FIGURES 1 and 2.

The tire may be provided with the annular "breaker" strip or strips 17 which, of course, extend annularly around the outer circumference or peripheral portion of the tire, next to the filament strands 7 and is securely molded in or under the tread portion 5.

In mounting the improved toroidal tire 4 on the drop center rim 1 the tire must, of course, be deflated. The yieldability of the annular rim seating area 12 and the resiliency of the annular tensioning means 16 permits the inner circular circumferential portion of the tire to be stretched sufficiently to slip over the side beads 3 of the rim. The tensioning means, such as the springs 16a, 16b, 16c and 16d contract the inner annular portion of the tire radially inward when released into firm seating and contacting engagement in the drop center tire receiving portion 13 of the rim. The tension of the springs 16-16d will draw the elastic portion 14 toward the rim because it is "inside' of the toroidal reinforcing filaments or strands 7. After the tire is in place, somewhat as shown in FIGURE 1, and inflated the internal pressure in the area 8 will firmly expand the inner rim engaging portion 12 into tighter contact with the surface of the drop center portion 13 of the rim and assist in resisting slippage therebetween.

Should the tire become deflated in use, for instance by puncture, the annular spring tensioning means 16 will satisfactorily retain the tire on the rim 1 and retard slippage of the tire on the rim until the vehicle on which the tire is mounted is stopped and the tire removed and repaired or replaced.

The cords in the "breaker" strip 17, of course, resist radial outward expansion of the tire while on the rim. The soft resilient inner rim engaging portion 14 can be expanded radially outward, or stretched to slip over the rim. This can only occur by the application of considerable force necessary to stretch the annular spring means 16, and can be done only when the tire is deflated.

Referring now to FIGURES 4, 5 and 6, the main difference in the construction is that of the tensioning means for seating the inner rim engaging and seating portion of the tire in a conventional solid rim, preferably of the solid drop center variety. The same reference numerals will be used in these figures to denote similar parts as in FIGURES 1, 2 and 3, except that these numerals will be primed (').

The numeral 1' denotes a "drop center" rim of somewhat conventional contour with the drop center portion 2' and usual side beads 3'.

The toroidal wound tire, indicated at 4', has the tread portion 5', and side walls 6' with the toroidal wound filament strands or cords 7' imbedded therein between the inner and outer surfaces of the tire, and is inflatable having an inflation (and deflation) valve 11'.

The rim engaging and seating portion 12' is contoured to seat or fit the drop center contour portion 13' of the rim 1', between the beads 3'. The tire carcass between the side walls 6' comprises a portion 14' molded of relatively softer elastic rubber-like matrix 15'.

The resilient tensioning means 16' is molded in the matrix 15' between the toroidal strands 7' and the inner inflatable area 8' and is under radial inward tension for drawing the portion 14' into firm seating relation in the rim 1'.

The annular spring tensioning means 16' in this form of the invention is an annular "zig-zag" shape spring as shown more particularly in FIGURES 5 and 6 and molded in the matrix 15', and zig-zags back and forth around the tire, substantially as shown.

Overlying the toroidally wound strands 7' adjacent the tread 5' are the transversely disposed annular side by side reinforcing strands 17' under, or forming part of the "breaker" strip.

FIGURES 7 and 8 illustrate a further slight modification in which parts similar to those disclosed in FIGURES 1 to 3, and 4 to 6 are given the same reference numerals, except that they are double primed ("), and specific reference thereto should be unnecessary.

The strong highly elastic soft rim seating portion 14" of the matrix 15" incorporates the tensioning means 16" for the purpose previously described. However, a plurality of hollow inserts 18 are secured in spaced relation in the circular zig-zag spring tensioning means 16", substantially as shown. The inserts 18 and the zig-zag wire springs 16" are connected together and under tension. The toroidal strands 7" extend around the axis of the tire 1", and are molded in the matrix 15" between the inserts 18 and the rim seating inner periphery or rim engaging portion 12". In other words, the tensioning means 16, 16' or 16" is always disposed inside of the tire between the toroidal strands 7, 7' or 7" and the inner inflation area 8, 8' or 8", so as to contract or tension the strands and the rim seating contour or rim engaging portion 12" of the tire toward the tire receiving contour portion 13" of the rim, between the side beads 3" thereof.

The inserts 18 may be provided with threaded fastener receiving bores 19 therein, which "line up" with screw receiving openings 20 in the rim 1" and suitable threaded fasteners or screws 21, when inserted and threaded into the inserts 18, and drawn up tight, secure the tire 4" on or in the rim 1" against slippage.

The heads 22 of the screw fasteners 21 are accessible from the inner peripheral portion of the rim 1" and must be removed before the inner periphery of the tire can be manipulated and stretched for removal over one of the beads 3", after being deflated.

In the sectional view shown in FIGURE 9, the circular coil spring tensioning means 16x is employed, similar to FIGURES 1 to 3. However, a positive interengaging means may be provided in the form of uniformly spaced projections or lugs 23 around the inner softer elastic rubber like mastic portion 24 of the tire which seat in complemental similarly spaced recesses or sockets 25 in the periphery of the rim 1x. These recesses and lugs 25 and 23 provide a positive interlock and prevent slippage between the tire and the rim under all conditions, particularly when the tire, for any reason, loses its inflation pressure.

The annular tensioning means or spring 16x contract the inner periphery of the tire toward the rim 1" to hold the lugs 23 in the depression or sockets 25 provided in the rim.

For purposes of exemplification, a few embodiments of the invention have been shown and described to the best understanding thereof. However, it will be apparent that changes and modifications in the arrangement and construction of the parts thereof may be resorted to without departing from the true spirit and scope of the invention as defined in the accompanying claims.

We claim:

1. A toroidal wound tire for use on a solid rim having an annular depressed tire receiving channel with annular side beads, said tire comprising an inflatable resilient carcass, having an annular tread portion with spaced side walls extending inwardly and an integral softer flexible resilient rubber-like rim engaging and fitting portion connected between the annular inner portions of the tire side walls in radially inward spaced relation to said tread portion to form an annular inner tire inflation area between said tread, side walls, and integral softer flexible resilient rubber-like rim engaging portion, said softer, flexible resilient rubber-like rim engaging portion having an annular rim engaging surface contoured to fit and seat in the annular depressed channel surface of a conventional solid non-split tire rim between the side beads thereof, annular resilient tensioning means extends around the tire, in the softer flexible resilient rubber-like rim channel engaging portion thereof between the same and said annular tire inflation area, for contracting the annular rim engaging and fitting portion of the tire radially inward, when the tire is mounted on a conventional non-split solid type annular depressed channel tire receiving rim having an annular tire receiving surface in said channel between the annular side beads thereof, into positive seating contact in the annular tire receiving channel, said tire having flexible toroidally wound reinforcing filament strands encircling the tire substantially transverse to the circular axis thereof between the exterior and interior tire surfaces, extending through said integral, softer, flexible, resilient, rubber-like rim engaging and contacting portion, between the rim contacting portion thereof and said annular resilient tensioning means.

2. An inflatable toroidal wound filament strand tire for application and use on an annular conventional solid tire rim having an annular depressed tire receiving central channel with spaced tire retaining flanges at the opposite sides thereof, said tire comprising an inflatable resilient, annular in cross section, carcass comprising an integral tread, side walls, and inner annular rim fitting and seating portion connecting the inner annular edges of the side walls together, surrounding the annular tire inflation area, said annular channel fitting and seating portion of said tire comprising a softer resilient flexible rubber-like portion contoured to fit and seat in the annular depressed channel portion of a conventional depressed channel solid metal rim between the annular side flanges thereof, and stretchable, when the tire is deflated, over the outer periphery of the rim into the tire receiving channel, annular extensible tensioning means extending through the softer resilient rubber-like rim engaging portion around the tire between the rim engaging surface of the tire and the annular inflation area, and toroidally wound filament strands in the carcass encircling the inflation area, extending through said softer resilient rubber-like tire rim seating and engaging portion between said annular spring extensible tensioning means and the rim seating and engaging tire portion.

3. A toroidally wound resilient tire as claimed in Claim 2 in which said extensible tensioning means comprises annular endless coil springs molded within said annular resilient rubber-like rim engaging portion between the inner inflation area and the toroidally wound flexible filament strands, for contracting said rim engaging surface inwardly into tensioned contact with the outer surface of depressed channel portion of the rim, when the tire is stretched over a drop center rim and seated into the depressed annular channel portion thereof, and means for inflating the inflation area of the tire.

4. A toroidal wound tire as set forth in Claim 2 in which the annular spring tensioning means comprises an endless annular resilient wire spring disposed in the rim engaging and seating softer resilient rubber-like portion between the tire inflation area and the toroidal wound filament strands and extends in substantially zig-zag fashion around the tire back and forth across the rim seating and fitting portion of the relatively softer flexible resilient rubber-like portion and molded therein under tension, for contracting the rim channel engaging portion into firm contacting engagement with the depressed annular tire receiving channel of a conventional drop center tire rim when the tire is being mounted thereon.

5. A toroidal wound filament strand resilient tire as claimed in Claim 2 including a plurality of metallic inserts molded in said rim engaging and seating softer flexible resilient rubber-like portion of said tire between the tire inflation area and the toroidal wound filament strands and integrally interposed and connected in substantially equally spaced relation in said annular spring tensioning means, said inserts having threaded openings formed therein extending toward the rim, and a solid one piece tire rim therefore having an annular depressed channel receiving the softer flexible resilient rubber-like channel seating and engaging tire portion therein, said rim having fastener receiving openings therein aligned with the threaded openings in said metallic inserts, when the tire is mounted on said rim in said depressed annular channel thereof, and adapted to receive threaded fasteners through said aligned openings to anchor said tire on said rim against relative circular slippage therebetween.

6. A toroidal wound filament strand tire as claimed in Claim 2 in which the inner annular rim channel engaging surface of said rim engaging and seating softer flexible rubber-like portion of said tire is formed with substantially equally circular spaced radial inwardly projecting lug members, and a solid tire receiving rim having an annular depressed channel for receiving and seating said softer flexible rubber-like annular tire portion thereon, said channel formed with complemental lug receiving recesses therein receiving the said substantially equally circular spaced radial inwardly projecting lug members therein, to resist relative circular slippage between said tire and rim, when said tire is mounted on said rim.